United States Patent
Rueb et al.

[11] Patent Number: 6,050,693
[45] Date of Patent: Apr. 18, 2000

[54] COLLIMATOR FOR LASER PROJECTOR

[75] Inventors: Kurt D. Rueb, Kitchener; John P. Wieczorek, Waterloo, both of Canada

[73] Assignee: Virtek Vision Corporation, Waterloo, Canada

[21] Appl. No.: 08/814,669

[22] Filed: Mar. 11, 1997

[51] Int. Cl.[7] .................................................. G02B 5/08
[52] U.S. Cl. ...................... 359/857; 359/850; 359/366; 359/389
[58] Field of Search ...................... 359/857, 850, 359/366, 389

[56] References Cited

U.S. PATENT DOCUMENTS

| | | | |
|---|---|---|---|
| 5,000,564 | 3/1991 | Ake | 356/141 |
| 5,017,008 | 5/1991 | Akiyama | 356/336 |
| 5,191,469 | 3/1993 | Margolis | 359/366 |
| 5,296,963 | 3/1994 | Murakami et al. | 359/202 |
| 5,381,258 | 1/1995 | Bordignon et al. | 359/202 |

*Primary Examiner*—Cassandra Spyrou
*Assistant Examiner*—Mohammad Y. Sikder
*Attorney, Agent, or Firm*—Howard & Howard

[57] ABSTRACT

An improved laser projector collimator includes a plurality of specifically designed and arranged mirrors and lenses such that reflected light from a housing window for the laser projector is not directed onto a reflected light source sensor. In this way, the sensor only sees light reflected from a reference reflector. In addition, the specific arrangement of the lenses and mirrors is such that the overall length of the collimator housing is greatly reduced.

19 Claims, 1 Drawing Sheet

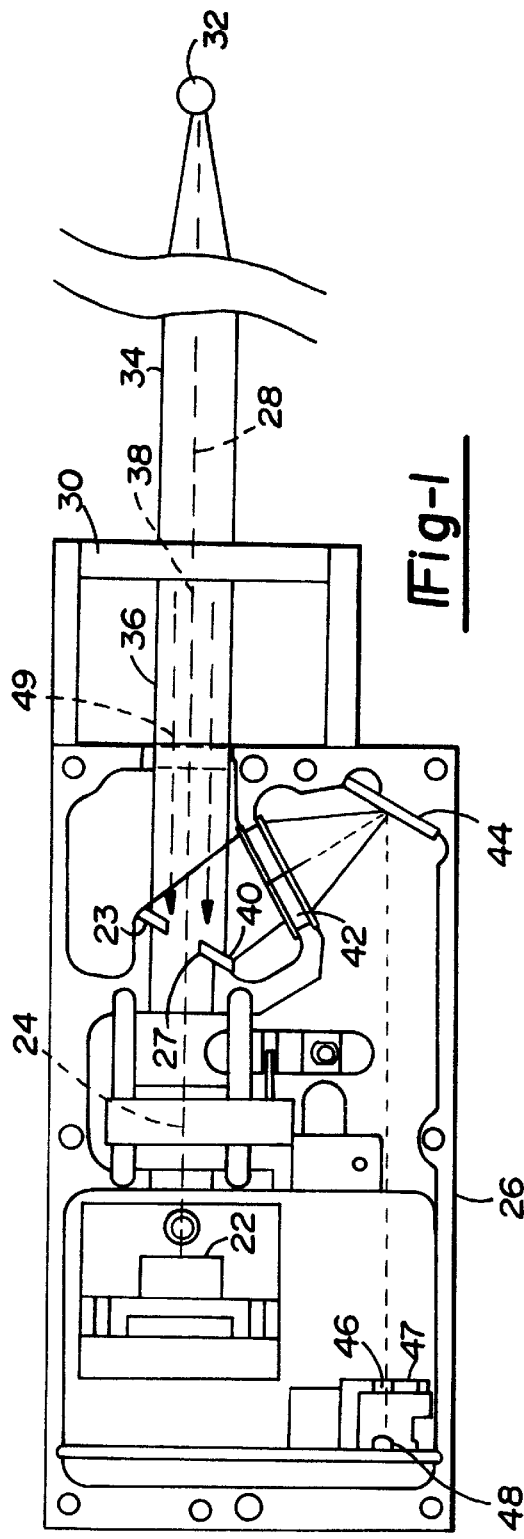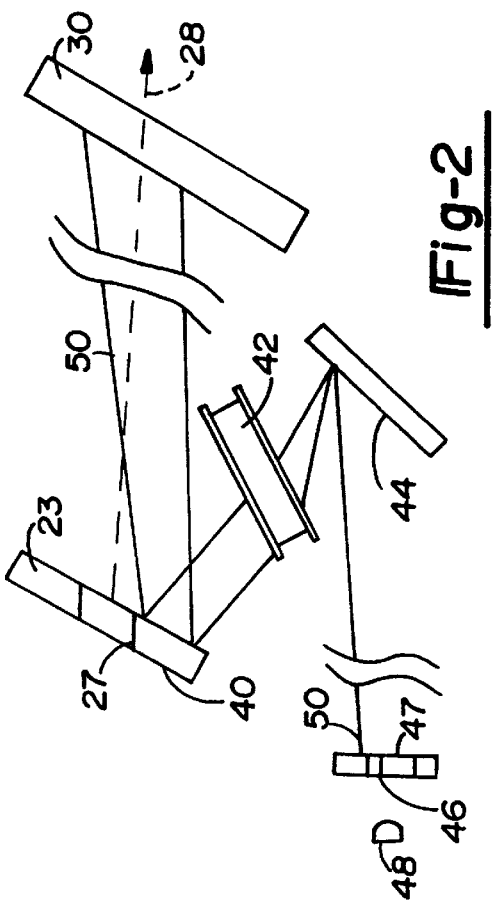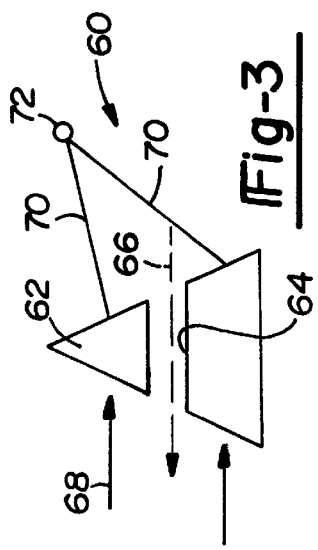

COLLIMATOR FOR LASER PROJECTOR

BACKGROUND OF THE INVENTION

This invention relates to an improved laser collimator in which reflected light from a glass window on a laser projector housing is removed from light reflected to a sensor.

Laser scanning projectors are utilized in many industrial applications. Laser projectors are utilized to provide a scanned image to replace templates for the alignment of parts such as vehicle body plies, and truss components. In addition, laser projectors are utilized in other industrial applications such as indicating the location to remove parts from a piece of fabric or leather.

An initial step in utilizing such laser systems is to calibrate the location of the laser projector relative to reference points adjacent to the workpiece. To this end, a laser beam is directed off of reference reflectors. The light is reflected back from the reference reflector to a sensor on the laser projector housing. A control identifies the location of the reference points through the reflected light, and is able to identify the location of the projector in space. The technology utilized in such applications is known.

There are some challenges to this type of system. In one major challenge, the sensor for the reflected light must only be exposed to the light reflected from the reference point. Thus, light reflected from components in the laser system would preferably not reach the sensor. In the known laser projectors, there is a glass window or lens placed forwardly of the laser source, and through which the laser beam is directed toward the reference reflector. Light may sometimes be reflected from this window, and may be misidentified at the sensor as reflected light from the reference point. This is undesirable.

SUMMARY OF THE INVENTION

In a disclosed embodiment of this invention, the collimator housing for focusing and directing the laser light includes structure such that any light reflected from the window is not directed to the reflected light sensor. In a preferred embodiment of this invention, the laser beam passes through a central hole in a mirror. The laser beam then passes through the outer housing window toward the work surface. Light reflected from the reference reflector will generally be parallel to the axis of the light from the laser. Thus, reflected light would tend to be directed back toward the mirror with the central hole. However, the light from the reference reflector is scattered. As such, the reflected light from the reference point is scattered about the entire surface of the mirror with the central hole.

Should any light be reflected from the window, that light is reflected directly back along the direction, and axis of the laser light. The light reflected back from the window would tend to be directed along the same line as the laser light, and thus would pass through the central hole in the mirror. Light reflected off of the mirror is directed through a focusing lens, to a turning mirror, and from the turning mirror to the sensor. The sensor is provided with a filter having a small central hole such that only light directed along a specific angle contacts the sensor.

The above-described invention prevents reflected window light from reaching the sensor, and will only direct light from the reference reflector onto the sensor.

The above situation exists when the window is positioned perpendicular to the direction of the laser light. In this case, the reflected light travels directly along the same line as the laser light, and would thus pass through the central hole. This light is thus removed and not sent to the sensor.

In a second scenario, the window is positioned at an angle other than perpendicular to the direction of the laser light. Light reflected from such a window is directed at an angle non-parallel to the laser light. This light bounces off of the mirror, but is focused onto the turning mirror at a location other than the specific location to be directed through the filter and at the sensor. That is, the mirror with the central hole, the focusing lens and the turning mirror are configured and positioned such that only light which is directed onto the mirror in a direction parallel to the direction of the laser light is focused through the filter and onto the sensor. Thus, in the case where the window is positioned at an angle other than perpendicular to the direction of laser light, reflected light from that window will be directed onto the filter and not onto the sensor. Thus, the light from the window will also not reach the sensor in this scenario.

In other features of this invention, the various mirrors and lenses are positioned within a new collimator housing. The positioning of the lenses is such that the overall size of the collimator housing is greatly reduced. Most preferably, the first mirror with the central hole reflects the light back in a direction generally toward the window, although at an angle. The light is then bent by turning the mirror back in the reverse direction toward the sensor. By bending the light twice in this way, the overall required axial length of the collimator housing is greatly reduced from the prior art. There is a minimum distance required for the reflection of the beam to achieve the necessary focusing. By bending the light through the two turns, the inventive collimator housing is able to achieve this necessary distance in a relatively small housing.

In a second embodiment, the central hole is provided in some other type of optical device, rather than a mirror. In a preferred embodiment, the optical device is a prism. The prism has a central hole and operates as the mirror did in the first embodiment. Thus, light reflected from the window is still filtered out as described above.

These and other features of the present invention would be best understood from the following specification and drawings, of which the following is a brief description.

BRIEF DESCRIPTION OF THE DRAWING

FIG. 1 schematically shows an inventive collimator housing in a first possible arrangement.

FIG. 2 shows a second possible arrangement.

FIG. 3 shows a second embodiment wherein a mirror is replaced with a prism.

DETAILED DESCRIPTION OF A PREFERRED EMBODIMENT

An improved collimator 20 is illustrated in FIG. 1. Collimator 20 includes a laser diode 22 providing a laser source. A lens 24 is movable to optimize and focus the light from the laser diode 22. A collimator housing 26 provides a mounting surface for the various members to be described in this invention.

A first mirror 23 has a central hole 27, and the laser beam 28 passes through the central hole 27. The laser beam 28 also passes through a window 30 spaced toward an outer end of the collimator housing 26. The window 30 structure and location are shown somewhat schematically. Typically, a window is mounted on an outer end of the projector housing. Another window may be mounted on the outer end of the collimator housing.

Preferably, the laser diameter is 5 mm, and the hole 27 is also 5 mm. The size of the hole has been exaggerated to illustrate the optical paths.

As shown, a reference point 32 is positioned forwardly of the system 20. Reference point 32 is of the reflector type typically mounted on a work surface. Reflected light from the beam 28 is read by the system 20 to determine the location of the system 20 relative to the reference point 32. This allows the system to calibrate its location in space such that it can accurately scan and project laser images onto a work surface.

The reference point 32 is a reflector that reflects scattered light back from the beam 28 as shown at 34. This light passes through the window 30, and is returned as shown at 36 towards the mirror 23. As shown, since the light from reflector 32 is scattered, it hits the mirror 23 at surfaces other than the central hole 27. Thus, a portion of the light is reflected onto the mirror as shown at 40. This light passes through a focusing lens 42. Focusing lens 42 is preferably configured such that it will focus light directed generally parallel to the direction of the laser onto the mirror surface 40, at a point on mirror 42 where it will be seen by a sensor. Thus, the light is reflected onto a turning mirror 42, and through a central pin hole 46 in a filter 47 onto a sensor 48. The positioning of the mirror surface 40, the focusing lens 42, and the turning mirror 44 are selected such that only light which is directed onto the mirror surface 40 generally parallel to the central axis of the hole 27, and thus the direction of the laser beam 22, will be directed through hole 46, and to the sensor 48.

The light reflected from the window 30 will not reach sensor 48 as will be explained. FIG. 1 shows the case wherein the window 30 is positioned generally perpendicular to the axis of the laser beam 28. In such an orientation, light 49 is reflected from the window 30 back along the line of the laser beam 28. This light will pass through the central hole 27, as it will not be scattered as is light reflected from reflector 32. Thus, this light will not be seen by sensor 48.

FIG. 2 shows a second case. Window 30 is positioned at an angle other than perpendicular to the axis of beam 28. In this case, light 50 from window 30 is reflected onto mirror surface 40. That light then passes through the focusing lens 42, and onto the turning mirror 44. However, the positioning of the mirror surface 40, focusing lens 42 and mirror surface 44 are such that only light which directed onto the mirror surface 40 parallel to the direction of the laser beam is directed through the pin hole 46. As shown at 52, the light reflected from window 30 in this instance will hit the filter, and not be directed through the pin hole 46. As such, this light will not be directed onto the sensor 48.

With the improved invention, only light reflected from the reference point is directed onto sensor 48. This is an improvement over the prior art, and a good deal of background noise and false readings by the sensor are thus eliminated.

In addition, the inventive collimator housing using the double mirror turns results in a relatively small overall housing.

FIG. 3 shows a system 60 wherein a prism 62 having a central hole 64 replaces the mirror 23. The laser light 66 passes through the central hole 64 as in the above embodiments. Light 68 reflected from the reference point 32 is directed onto the prism 62, and focused by the prism as shown at 70 onto a point 72. Point 72 can be associated with a mirror, a sensor, or any other arrangement, such as described in the above embodiments. Light reflected back from the window 30 would be directed back through the hole 64 in the first scenario shown in FIG. 1. The light being directed from the window onto the prism 62 in the FIG. 2 scenario, (i.e. nonparallel to the axis of the central hole 64 or beam 66) is directed by the prism 62 to a point other than point 72. As with the scenario in FIG. 2, this light would thus not be directed onto the sensor.

A worker of ordinary skill in the art would recognize that certain modifications would come within the scope of this invention. For that reason, the following claims should be studied to determine the true scope and content of this invention.

We claim:

1. A laser projector system comprising:

a housing for mounting a laser projector;

a laser light beam directed from said laser projector to a workpiece along a first axis toward an outer end of said housing;

an optical device having a back surface facing said laser projector and a reflecting front surface facing said workpiece, and a central hole, said laser light beam being directed from said laser projector through said central hole to a reflective reference point on said workpiece and said laser light beam redirected inwardly from said workpiece to said reflecting surface of the optical device; wherein said redirected laser light beam is generally parallel to said first axis;

a sensor for receiving said redirected laser light beam reflected from said reflecting surface of the optical device.

2. A laser projector as recited in claim 1, wherein said optical device is a first mirror.

3. A laser projector system as recited in claim 2, wherein said light from said first mirror passes through a focusing lens and is focused onto a second mirror, said second mirror directing said light towards said sensor.

4. A laser projector system as recited in claim 3, wherein said first mirror faces toward said outer end, and said second mirror facing toward said laser projector from said first mirror such that said light is bent twice before being directed toward said sensor.

5. A laser projector system as recited in claim 1, wherein a window is placed adjacent said outer end of said projector, said laser light beam passing through said window.

6. A laser projector system as recited in claim 5, wherein said window is positioned perpendicular to said first axis and light reflected from said window is directed through said central hole.

7. A laser projector system as recited in claim 5, wherein said window is positioned at a non-perpendicular angle relative to said first axis and light reflected from said window is directed away from said sensor.

8. A laser projector system as recited in claim 1, wherein said laser projector is a laser diode positioned on an opposed side of said optical device from said outer end.

9. A laser projector system as recited in claim 1, wherein a filter is positioned forwardly of said sensor, said filter only passing a particular angle of light to said sensor.

10. A laser projector system as recited in claim 1, wherein said optical device is a prism.

11. A method of operating a laser projector system comprising the steps of:

(1) providing a housing for mounting a laser projector;

(2) providing a laser light beam directed from said laser projector to a workpiece along a first axis toward an outer end of said housing;

(3) providing an optical device having a back surface facing said laser projector and a reflecting front surface facing said workpiece, and a central hole, said laser projector passing a laser beam from said laser projector through said central hole to a reflective reference point on said workpiece, and said laser light beam redirected inwardly from said workpiece to said reflecting surface of the optical device; said reflecting surface of said optical device being positioned to direct said redirected light beam onto a sensor; wherein said redirected light beam is generally parallel to said first axis of said laser beam.

12. A method as recited in claim 11, wherein said optical device is a first mirror.

13. A method as recited in claim 12, wherein said light is focused from said first mirror onto a second mirror, and is then turned toward said sensor.

14. A method as recited in claim 13, wherein a small aperture filter is placed forwardly of said sensor, such that only a particular angle of light from said second mirror is directed onto said sensor.

15. A method as recited in claim 11, wherein said optical device is a prism.

16. laser projector system comprising:

a housing for mounting a laser projector;

a laser light beam directed from said laser projector to a workpiece along a first axis toward an outer end of said housing;

a first mirror having a back surface facing said laser projector and a reflecting front surface facing said workpiece positioned along said first axis and having a hole aligned with said first said axis, said laser light beam being directed outwardly through said hole to a reflective reference point on said workpiece, and said laser light beam redirected inwardly from said workpiece to said reflecting surface of said first mirror; wherein said redirected laser light beam is generally parallel to said first axis; and a sensor for receiving said redirected light beam reflected from said reflecting surface of said mirror.

17. The laser projector system of claim 16 wherein said mirror includes an outwardly facing mirror surface, said light traveling inwardly and reflected off said mirrored surface and subsequently onto said sensor.

18. The laser projector system of claim 17 wherein said laser light beam travels outwardly through said hole in said mirror and subsequently reflects inwardly off of a surface onto the mirror surface and then onto the sensor.

19. A method of operating a laser projector system including the steps of:

(a) providing a housing for mounting a laser projector and a mirror; said mirror having a back surface facing said laser projector and a reflecting front surface facing a workpiece, and a hole;

(b) directing a laser light beam from said laser projector to a reflective reference point on said workpiece along a first axis toward an outer end of said housing outwardly through said hole in said mirror;

(c) reflecting said laser light beam inwardly from said workpiece to said reflecting front surface of said mirror after said step (b); wherein said inwardly reflected laser light beam is generally parallel with said first axis;

(d) reflecting said inwardly reflected laser light beam from said reflecting front surface of said mirror to a sensor after step (c); and (e) detecting said reflected laser light beam reflected from said mirror in said step (d).

* * * * *